(12) United States Patent
Suzuki

(10) Patent No.: US 7,961,942 B2
(45) Date of Patent: Jun. 14, 2011

(54) APPARATUS AND METHOD FOR GENERATING CATALOG IMAGE AND PROGRAM THEREFOR

(75) Inventor: Ken Suzuki, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 943 days.

(21) Appl. No.: 11/886,244

(22) PCT Filed: Mar. 15, 2006

(86) PCT No.: PCT/JP2006/305618
§ 371 (c)(1),
(2), (4) Date: Sep. 13, 2007

(87) PCT Pub. No.: WO2006/098480
PCT Pub. Date: Sep. 21, 2006

(65) Prior Publication Data
US 2008/0193012 A1 Aug. 14, 2008

(30) Foreign Application Priority Data

Mar. 16, 2005 (JP) ................................ 2005-074938

(51) Int. Cl.
*G06K 9/00* (2006.01)
(52) U.S. Cl. ........ 382/167; 382/100; 382/254; 382/274; 382/305
(58) Field of Classification Search .................. 382/100, 382/167, 275, 284, 305
See application file for complete search history.

(56) References Cited

U.S. PATENT DOCUMENTS

| | | | | |
|---|---|---|---|---|
| 5,546,475 A | * | 8/1996 | Bolle et al. | 382/190 |
| 5,896,122 A | * | 4/1999 | MacDonald et al. | 345/602 |
| 6,592,033 B2 | * | 7/2003 | Jennings et al. | 235/385 |
| 7,118,026 B2 | * | 10/2006 | Harris et al. | 235/375 |
| 7,623,250 B2 | * | 11/2009 | Moctezuma de la Barrera et al. | 356/604 |
| 2004/0227977 A1 | | 11/2004 | Yoshida | |

FOREIGN PATENT DOCUMENTS

| | | |
|---|---|---|
| EP | 0 989 739 A2 | 3/2000 |
| JP | 11-136528 A | 5/1999 |
| JP | 2001-352459 A | 12/2001 |
| JP | 2004-336516 A | 11/2004 |
| JP | 2005-12450 A | 1/2005 |
| WO | WO 92/05470 A1 | 4/1992 |

OTHER PUBLICATIONS

European Office Action for Application No. 06729585.7, dated Jan. 27, 2011.

* cited by examiner

*Primary Examiner* — Bhavesh M Mehta
*Assistant Examiner* — Stephen R Koziol
(74) *Attorney, Agent, or Firm* — Birch, Stewart, Kolasch & Birch, LLP

(57) ABSTRACT

A catalog of images whose lightness has been changed in accordance with human vision is generated. For this purpose, a first image having reference shadow lightness, a second image having reference highlight lightness, a third image having desired lightness, a fourth image having lightness that is visually perceived to evenly divide the lightness between the first image and the third image, and a fifth image having lightness that is visually perceived to evenly divide the lightness between the third image and the second image are generated. The first to fifth images are included in a catalog image.

13 Claims, 3 Drawing Sheets

APPARATUS AND METHOD FOR GENERATING CATALOG IMAGE AND PROGRAM THEREFOR

TECHNICAL FIELD

The present invention relates to an apparatus and a method for generating a catalog image by generating a plurality of images to be included in the catalog image from the same image, while varying the lightness thereof. The present invention also relates to a program for causing a computer to execute the method.

BACKGROUND ART

When an image obtained by a digital camera or the like is printed, image processing such as lightness conversion processing, gradation conversion processing, white balance adjustment processing, color conversion processing, and sharpness processing is carried out thereon. The image after the image processing is then printed to obtain a print of a desired image quality. However, in conventional image processing, only one kind of parameter can be specified in each type of processing. Therefore, printing needs to be carried out repeatedly while changing a parameter in a trial and error manner until a print of a desired image quality can be obtained.

For this reason, a system has been proposed in Japanese Unexamined Patent Publication No. 11(1999)-136528 for letting a user select a desired one of images from a catalog image. In this system, processed images are obtained through image processing on the same image with use of various kinds of parameters whose values are set differently, and a catalog image is generated that includes the processed images. According to this system, a trial and error process is not necessary, and an image of a desired image quality can be obtained efficiently.

In the case where a parameter of lightness has been changed in image processing, the change in the parameter does not necessarily agree with a change of lightness perceived by human vision. For example, in the case where the value of the parameter of lightness has been doubled, the lightness of an image before and after the change does not seem to be doubled to human vision.

In the system described in Japanese Unexamined Patent Publication No. 11(1999)-136528, a range of change in each of the parameters is predetermined. Therefore, although parameters of various kinds are used for lightness, a degree of change in each of the parameters is predetermined. Consequently, the change does not agree with the change in lightness perceived by human vision, and a trial and error process still needs to be carried out until an image having lightness satisfying a user can be obtained.

The present invention has been conceived based on consideration of the above circumstances. An object of the present invention is therefore to generate a catalog of images whose lightness has been changed to become appropriate for perception by human vision.

DISCLOSURE OF INVENTION

A catalog image generation apparatus of the present invention comprises:

image generation means for generating, from image data representing an image, a reference shadow image wherein a main subject of the image has a reference shadow lightness, a reference highlight image wherein the main subject has a reference highlight lightness, and a desired lightness image wherein the main subject has a desired lightness, and for generating from the image data at least one first intermediate lightness image having lightness that is visually perceived to evenly divide the lightness between the reference shadow image and the desired lightness image, and at least one second intermediate lightness image having lightness that is visually perceived to evenly divide the lightness between the reference highlight image and the desired lightness image; and catalog image generation means for generating a catalog image in which the reference shadow image, the at least one first intermediate lightness image, the desired lightness image, the at least one second intermediate lightness image, and the reference highlight image are arranged.

The reference shadow lightness refers to lightness that barely causes the main subject in the image to become unrecognizable due to too much darkness. More specifically, the reference shadow lightness may be lightness at a limit to cause this phenomenon or lightness that causes the darkest pixel value in pixels of the main subject to become slightly lighter (such as several percent in the distribution of a histogram of the main subject) than the darkest lightness reproducible by a system.

The reference highlight lightness refers to lightness that barely causes the main subject to become unrecognizable due to too much light. More specifically, the reference highlight lightness may be lightness as a limit to cause this phenomenon or lightness that causes the lightest pixel value in the pixels of the main subject to become slightly darker (such as several percent in the distribution of the histogram of the main subject) than the lightest lightness reproducible by the system.

In the catalog image generation apparatus of the present invention, the catalog image generation means may generate the catalog image by arranging the reference shadow image, the at least one first intermediate lightness image, the at least one second intermediate lightness image, and the reference highlight image in this order while enlarging the desired lightness image to become larger than the other images.

The catalog image generation apparatus of the present invention may further comprise printing means for printing the catalog image.

In this case, the catalog image generation apparatus of the present invention may also comprise white balance processing means for carrying out white balance adjustment processing on the catalog image in accordance with a light source in which a print of the catalog image is viewed.

In the catalog image generation apparatus of the present invention, the image data may be RAW image data.

A catalog image generation method of the present invention comprises the steps of:

generating, from image data representing an image, a reference shadow image wherein a main subject of the image has a reference shadow lightness, a reference highlight image wherein the main subject has a reference highlight lightness, and a desired lightness image wherein the main subject has a desired lightness;

generating, from the image data, at least one first intermediate lightness image having lightness that is visually perceived to evenly divide the lightness between the reference shadow image and the desired lightness image, and at least one second intermediate lightness image having lightness that is visually perceived to evenly divide the lightness between the reference highlight image and the desired lightness image; and generating a catalog image in which the reference shadow image, the at least one first intermediate lightness image, the desired lightness image, the at least one second intermediate lightness image, and the reference highlight image are arranged.

The catalog image generation method of the present invention may be provided as a program for causing a computer to execute the catalog image generation method.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

According to the present invention, the at least one first intermediate lightness image and the at least one second intermediate lightness image are generated, in addition to the reference shadow image, the desired lightness image, and the reference highlight image. The at least one first intermediate lightness image has the lightness that is visually perceived to evenly divide the lightness between the reference shadow image and the desired lightness image while the at least one second intermediate lightness image has the lightness that is visually perceived to evenly divide the lightness between the reference highlight image and the desired lightness image. Therefore, in the catalog image having the reference shadow image, the first intermediate lightness image or image, the desired lightness image, the at least one second intermediate lightness image, and the reference highlight image, a degree of change in the lightness perceived visually is evenly divided between the reference shadow image, the at least one first intermediate lightness image, and the desired lightness image, as well as between the desired lightness image, the at least one second intermediate lightness image, and the reference highlight image. Consequently, a user viewing the catalog image can appropriately select any one of the images having the lightness desired by the user.

By carrying out the white balance adjustment processing on the catalog image in accordance with the light source for viewing the print at the time of printing of the catalog image, the catalog image can be viewed in white balance in accordance with the light source. Therefore, the user can more appropriately select the image having the lightness desired by the user.

BEST MODE FOR CARRYING OUT THE INVENTION

Figure 1:
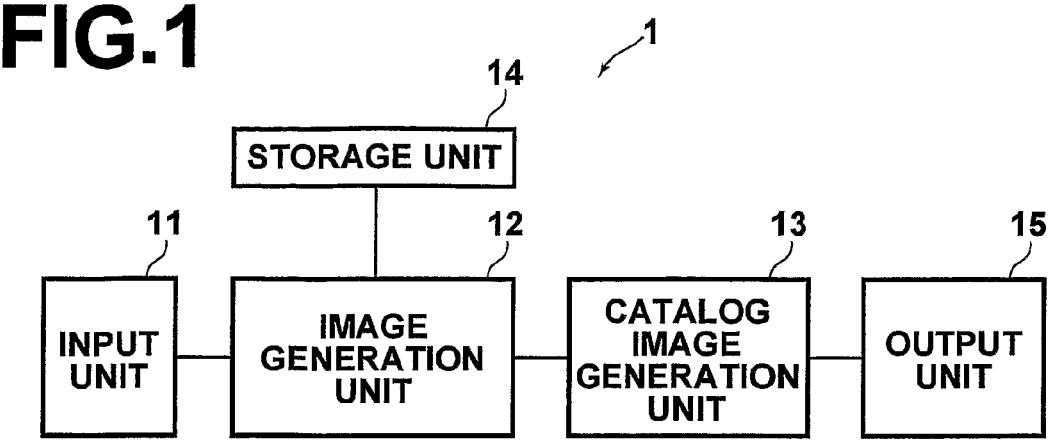
FIG. 1 is a block diagram showing the configuration of a catalog image generation apparatus of an embodiment of the present invention.

Hereinafter, an embodiment of the present invention will be described with reference to the accompanying drawings. FIG. 1 is a block diagram showing the configuration of a catalog image generation apparatus in the embodiment. As shown in FIG. 1, a catalog image generation apparatus 1 in this embodiment comprises an input unit 11, an image generation unit 12, a catalog image generation unit 13, a storage unit 14, and an output unit 15. The catalog image generation apparatus 1 generates a catalog image from image data input from the input unit 11, and outputs the catalog image from the output unit 15.

In this embodiment, the image data input from the input unit 11 are RAW image data.

More specifically, the catalog image generation apparatus 1 shown in FIG. 1 is mainly realized by a processor (not shown) operating according to a predetermined program. The processor may comprise a stand-alone computer. Alternatively, the processor may also be used for realizing a function of equipment for viewing images, for example.

The input unit 11 is used to input the image data for generating the catalog image and various kinds of data used for processing. The input unit 11 is an input device of a stand-alone computer, for example. In the case where the input unit 11 is built in equipment, the input unit 11 is a memory used for sending data to another functional block.

The image generation unit 12 carries out processing for generating images to be included in the catalog image according to a predetermined program. How the image generation unit 12 generates the images will be described later.

The catalog image generation unit 13 carries out processing for generating the catalog image having the images generated by the image generation unit 12, according to a predetermined program.

The storage unit 14 stores various kinds of information that is necessary for the image generation unit 12 to generate the images. More specifically, the storage unit 14 stores spectral luminance data regarding a light source used in image viewing (hereinafter simply referred to as the observation light source), a spectral reflectance of a photo sensitive material used in printing of the catalog image, color adaptation levels in various kinds of light sources, preferable remaining light color levels in the various kinds of light sources, and spectral sensitivities for models of cameras that obtain images, which are all necessary for the image processing unit 12 to carry out white balance adjustment processing as will be described later. In addition, the storage unit 14 temporarily stores a conversion profile for white balance adjustment that is generated as will be described later.

The output unit 15 is used for outputting image data representing the catalog image. The output unit 15 is an output device of a stand-alone computer, for example. In this embodiment, the output unit 15 is a printer.

Generation of the images by the image generation unit 12 will be described next. Based on camera model information added to a header of image data S0 input from the input unit 11 for processing, the image generation unit 12 obtains from the storage unit 14 one of the spectral sensitivities corresponding to the model of the camera by which the image data S0 have been obtained. Thereafter, the image generation unit 12 also obtains the spectral luminance data of the observation light source input from the input unit 11, a corresponding one of the color adaptation levels and a corresponding one of the remaining light color levels in the observation light source, and the spectral reflectance of the photo sensitive material used for printing the catalog image.

The image generation unit 12 then obtains parameters for white balance from the image data S0. The parameters for white balance can be found by calculating a mean of each of RGB colors comprising the image data S0 and by thereafter calculating a ratio of the mean to the mean of G.

The image generation unit 12 also calculates a spectral reflectance of the main subject in the image, based on the spectral sensitivity of the camera, and generates the conversion profile used for white balance conversion from the white balance parameters, a spectral luminance of the observation light source, the color adaptation level in the observation light source, the remaining light color level in the observation light source, and the spectral reflectance of the photo sensitive material. The image generation unit 12 temporarily stores the conversion profile in the storage unit 14.

Figure 2:
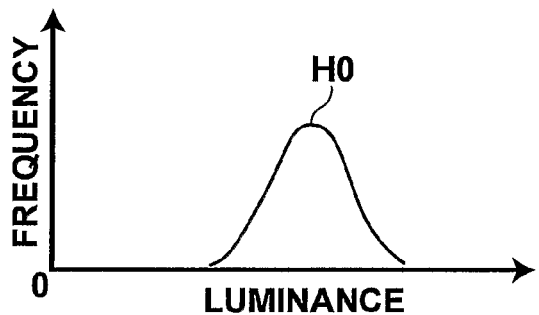
FIG. 2 shows an example of luminance histogram.

The image generation unit 12 extracts the main subject from an image S0 represented by the image data S0. In this embodiment, the main subject is a human face. By using a known face recognition algorithm, the image generation unit 12 recognizes the face in the image S0, and extracts an area of the recognized face as the main subject. The image generation unit 12 then finds a histogram of luminance of pixels in the extracted face area. FIG. 2 shows an example of the luminance histogram.

Figure 3:
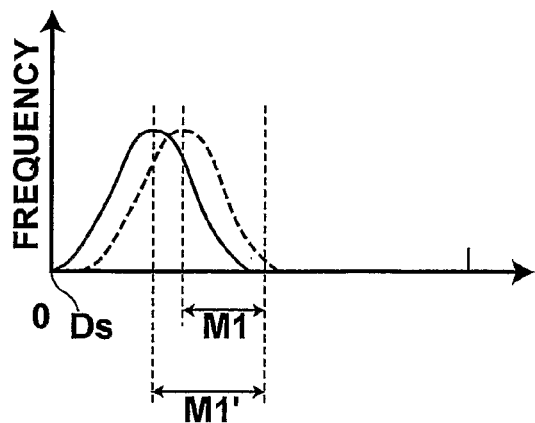
FIG. 3 shows how a correction value M1 is calculated.

The image generation unit 12 calculates a correction value M1 for correcting lightness of the image S0 so as to cause the face area to have reference shadow lightness. More specifically, the image generation unit 12 finds a correction value M1' for causing the luminance of an area Ds of the darkest shadow in a histogram H0 shown in FIG. 3 to become 0 whereby the darkest shadow area Ds becomes unrecognizable due to too much darkness. The image generation unit 12 then finds the correction value M1 by shifting the correction value M1' to the lighter side by approximately 3% of distribution of the histogram H0.

Figure 4:
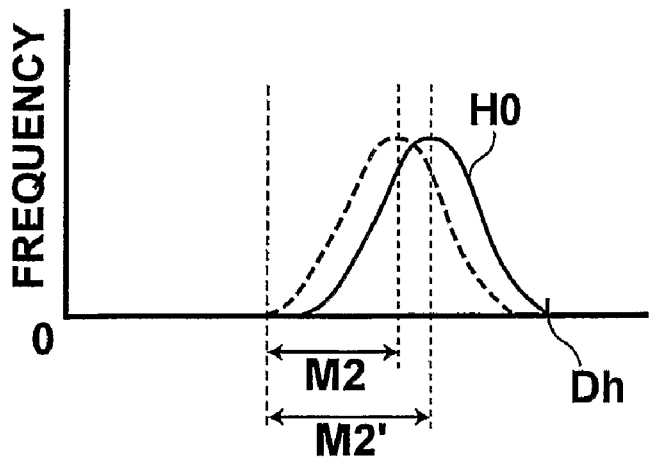
FIG. 4 shows how a correction value M2 is calculated.

The image generation unit 12 also finds a correction value M2 for correcting the lightness of the image S0 so as to cause the face area to have reference highlight lightness. More specifically, the image generation unit 12 finds a correction value M2' for causing luminance of an area Dh of the lightest highlight in the histogram H0 shown in FIG. 4 to become a maximum luminance (shown by adding a mark to the axis of luminance in each of FIGS. 3 to 5) whereby the lightest highlight area Dh becomes unrecognizable due to too much light. The image generation unit 12 then finds the correction value M2 by shifting the correction value M2' to the darker side by approximately 3% of the distribution of the histogram H0.

Figure 5:
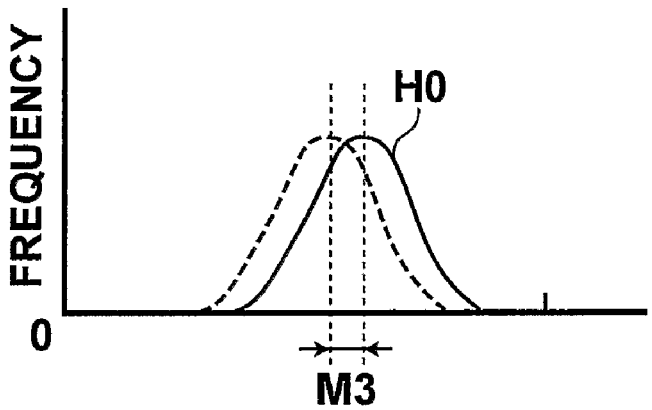
FIG. 5 shows how a correction value M3 is calculated.

The image generation unit 12 also finds a correction value M3 by shifting the histogram H0 so that the face area is within a predetermined range of desired skin-color lightness, as shown in FIG. 5.

The image generation unit 12 generates a half-processed image S0' by carrying out gradation conversion processing, color correction processing, and sharpness processing on the image S0. Thereafter, the image generation unit 12 generates a first image S1 having the face area as the main subject in the reference shadow lightness, by correcting the half-processed image S0' with use of the correction value M1. The image generation unit 12 also generates a second image S2 having the face area in the reference highlight lightness, by correcting the half-processed image S0' with use of the correction value M2. The image generation unit 12 then generates a third image S3 having the face area in desired lightness, by correcting the half-processed image S0' with use of the correction value M3.

Figure 6:
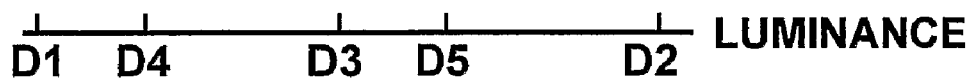
FIG. 6 shows a state wherein values of luminance D1, D2, and D3 of images S1, S2, and S3 are arranged along a luminance axis.

The image generation unit 12 thereafter generates an intermediate lightness image S4 whose lightness is visually perceived to evenly divide the lightness between the image S1 and the image S3. Values D1, D2, and D3 of luminance of the images S1, S2, and S3 are shown along a luminance axis in FIG. 6. In FIG. 6, each of the luminance values is a mean of luminance values of all the pixels in the corresponding one of the images S1 to S3. If an image S4 is found to have a luminance value as a mean of the luminance values D1 and D2, the image S4 to human vision does not seem to have the mean luminance between the luminance values D1 and D2 of the images S1 and S2. Since human vision is more sensitive in a darker range of lightness than in a lighter range thereof, a change in lightness is more easily perceived in the darker range even if a degree of the change is small.

For this reason, the image generation unit 12 generates the image S4 so that a difference between a luminance value D4 of the image S4 and the luminance value D1 of the image S1 (that is, D4−D1) can be smaller than a difference between the luminance value D3 of the image S3 and the luminance value D4 of the image S4 (That is, D3−D4). More specifically, the image generation unit 12 generates the image S4 so as to satisfy $\alpha<\beta$ where (D4−D1):(D3−D4)=$\alpha$:$\beta$.

The image generation unit 12 also generates an intermediate lightness image S5 whose lightness is visually perceived to evenly divide the lightness between the image S3 and the image S2. More specifically, the image generation unit 12 generates the image S5 so that a difference between a luminance value D5 of the image S5 and the luminance value D3 of the image S3 (that is, D5−D3) can be smaller than a difference between the luminance value D2 of the image S2 and the luminance value D5 of the image S5 (That is, D2−D5). In other words, the image generation unit 12 generates the image S5 so as to satisfy $\alpha<\beta$ where (D5−D3):(D2−D5)=$\alpha$:$\beta$. Values of $\alpha$ and $\beta$ are the same for the case of generation of the image S4 and the image S5.

The image generation unit 12 then adjusts the white balance of the images S1 through S5 by using the conversion profile found as has been described above, and generates finally processed images S11~S15.

Figure 7:
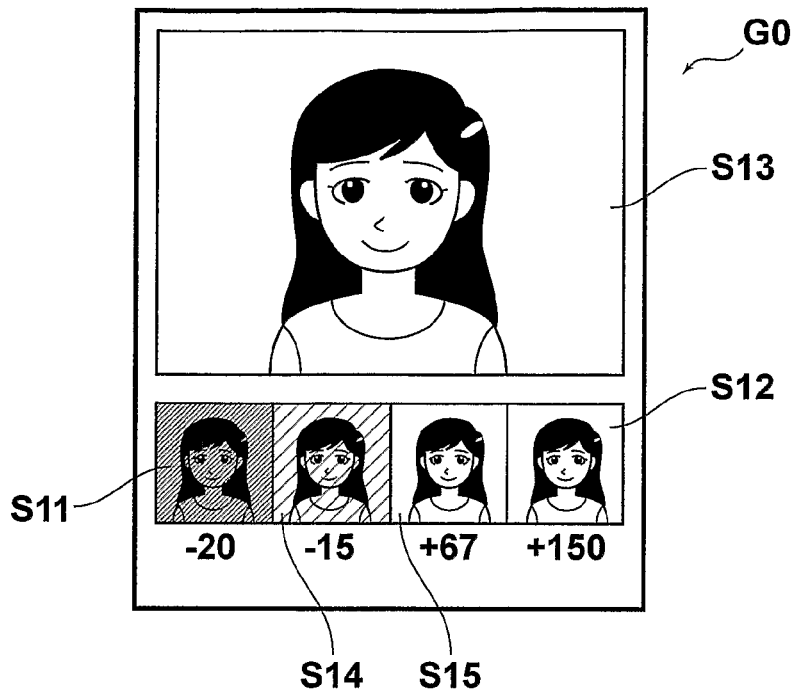
FIG. 7 shows an example of a catalog image.

The catalog image generation unit 13 changes sizes of the images S11~S15 so that the image S13 can be larger than the images S11, S12, S14, and S15. The catalog image generation unit 13 then generates a catalog image G0 by arranging the images S11, S14, S15, and S12 in this order below the image S13 as shown in FIG. 7. It is preferable for lightness correction values to be displayed below the images S11, S14, S15, and S12 relative to a reference lightness correction value of the image S13 that is assumed to be 0. The catalog image generation unit 13 may generate a catalog image having the images S1~S5 so that the catalog image G0 can be generated by carrying out the white balance adjustment processing using the conversion profile thereon.

Figure 8:
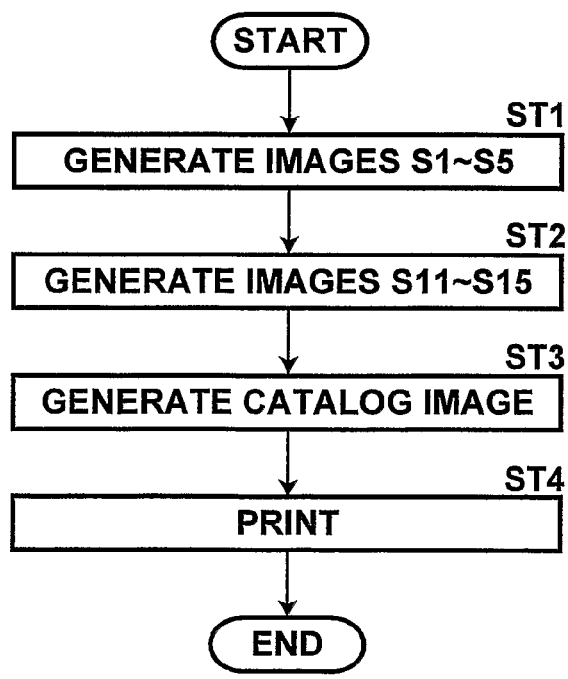
FIG. 8 is a flow chart showing a procedure carried out in the embodiment.

A procedure carried out in this embodiment will be described next. FIG. 8 is a flow chart showing the procedure carried out in this embodiment. The procedure starts when the input unit 11 receives input of the image to be processed. The image generation unit 12 firstly generates the images S1~S5 (Step ST1). The image generation unit 12 generates the processed images S11~S15 by carrying out the white balance adjustment processing on the images S1~S5 with use of the conversion profile (Step ST2). The catalog image generation unit 13 generates the catalog image G0 (Step ST3), and the output unit 15 prints the catalog image G0 (Step ST4) to end the procedure.

As has been described above, the images S11~S15 are generated in this embodiment to respectively have the reference shadow lightness, the reference highlight lightness, the desired lightness, the lightness that is visually perceived to evenly divide the lightness between the images S11 and S13, the lightness that is visually perceived to evenly divide the lightness between the images S13 and S12. The images S11~S15 are then included in the catalog image G0. Therefore, in the catalog image G0, the change in the lightness of the images S11, S14, S13, S15 and S12 seems to be evenly divided to human vision. Consequently, a user viewing the catalog image G0 can appropriately select any one of the images having the lightness desired by the user.

Furthermore, since the white balance adjustment processing is carried out at the time of printing of the catalog image G0 according to the observation light source in which the print of the catalog image G0 is viewed, the catalog image G0 can be viewed in the white balance according to the observation light source. As a result, the user can more appropriately select any one of the images having the lightness desired by the user.

In the embodiment described above, the images S4 and S5 are generated so as to satisfy $\alpha<\beta$. However, in the case where the change in the lightness is not large, $\alpha$ may be equal to $\beta$ if the lightness is evenly divided according to human vision. Therefore, the images S4 and S5 may be generated so as to satisfy $\alpha \leqq \beta$.

In the above embodiment, the image S14 is generated by evenly dividing the lightness between the images S11 and S13 according to human vision. However, the lightness may be divided in a visually even manner between the image S11 and the image S13 so that more intermediate lightness images can be generated. In addition, the image S15 is generated by evenly dividing the lightness between the images S13 and S12 according to human vision. However, the lightness may be divided in a visually even manner between the image S13 and the image S12 so that more intermediate lightness images can be generated. In this case, a luminance value of each of the intermediate luminance images internally divides a range between the luminance values of the neighboring intermediate lightness images, the image S11, the image S12, or the image S12 in the ratio of $\alpha:\beta$ in the luminance axis, satisfying the condition $\alpha \leqq \beta$.

In the embodiment described above, only the image S13 is enlarged, and the images S11, S14, S15, and S12 are arranged below the image S13 in this order. However, all the images may have the same size. In this case, the images S11, S14, S13, S15, and S12 are arranged in this order.

In the embodiment described above, the image data to be processed are RAW image data, and the RAW image data have more information than a compressed image such as an image of JPEG format. Therefore, if the model of the camera used for photography of the image is known, colors of the subject can be faithfully reproduced from color characteristics of the camera model. For this reason, when the half-processed image S0' is generated in the above embodiment, color correction equivalent to color reproduction in photography with use of a specific film can be carried out. In addition, color correction enabling faithful reproduction of an original color of the subject can also be carried out. Furthermore, color correction enabling more faithful reproduction of green, skin color, gray, light blue, and the like can be carried out. Moreover, color correction enabling faithful reproduction of a specific color in the subject (such as a color of cherry blossom, sea, autumn foliage, and snow) can also be carried out.

In the above-described embodiment, the image data are RAW image data. However, the catalog image G0 can be generated from compressed image data such as JPEG data in the same manner as the RAW image data.

The invention claimed is:

1. A catalog image generation apparatus comprising:
   image generation means for generating, from image data representing an image, a reference shadow image wherein a main subject of the image has a reference shadow lightness, a reference highlight image wherein the main subject has a reference highlight lightness, and a desired lightness image wherein the main subject has a desired lightness, and for generating from the image data at least one first intermediate lightness image having lightness that is appropriately perceived by human vision to evenly divide the lightness between the reference shadow image and the desired lightness image, and at least one second intermediate lightness image having lightness that is appropriately perceived by human vision to evenly divide the lightness between the reference highlight image and the desired lightness image; and
   catalog image generation means for generating a catalog image in which the reference shadow image, the at least one first intermediate lightness image, the desired lightness image, the at least one second intermediate lightness image, and the reference highlight image are arranged.

2. The catalog image generation apparatus according to claim 1, wherein the catalog image generation means generates the catalog image by arranging the reference shadow image, the at least one first intermediate lightness image, the at least one second intermediate lightness image, and the reference highlight image in this order while enlarging the desired lightness image to become larger than the other images.

3. The catalog image generation apparatus according to claim 1 further comprising printing means for printing the catalog image.

4. The catalog image generation apparatus according to claim 3 further comprising white balance processing means for carrying out white balance adjustment processing on the catalog image in accordance with a light source in which a print of the catalog image is viewed.

5. The catalog image generation apparatus according to claim 1, wherein the image data are RAW image data.

6. A catalog image generation method comprising the steps of:
   generating, from image data representing an image, a reference shadow image wherein a main subject of the image has a reference shadow lightness, a reference highlight image wherein the main subject has a reference highlight lightness, and a desired lightness image wherein the main subject has a desired lightness;
   generating, from the image data, at least one first intermediate lightness image having lightness that is appropriately perceived by human vision to evenly divide the lightness between the reference shadow image and the desired lightness image, and at least one second intermediate lightness image having lightness that is appropriately perceived by human vision to evenly divide the lightness between the reference highlight image and the desired lightness image; and generating a catalog image in which the reference shadow image, the at least one first intermediate lightness image, the desired lightness image, the at least one second intermediate lightness image, and the reference highlight image are arranged.

7. A non-transitory computer-readable recording medium storing a program for causing a computer to execute a catalog image generation method, the program comprising the procedures of:

generating, from image data representing an image, a reference shadow image wherein a main subject of the image has a reference shadow lightness, a reference highlight image wherein the main subject has a reference highlight lightness, and a desired lightness image wherein the main subject has a desired lightness;

generating, from the image data, at least one first intermediate lightness image having lightness that is appropriately perceived by human vision to evenly divide the lightness between the reference shadow image and the desired lightness image, and at least one second intermediate lightness image having lightness that is appropriately perceived by human vision to evenly divide the lightness between the reference highlight image and the desired lightness image; and generating a catalog image in which the reference shadow image, the at least one first intermediate lightness image, the desired lightness image, the at least one second intermediate lightness image, and the reference highlight image are arranged.

8. The catalog image generation apparatus according to claim 1, wherein the image generation means generates the at least one first intermediate lightness image to have a mean luminance closer in value to the mean luminance of the reference shadow image than to the mean luminance of the desired lightness image.

9. The catalog image generation apparatus according to claim 1, wherein the image generation means generates the at least one second intermediate lightness image to have a mean luminance closer in value to the mean luminance of the desired lightness image than to the mean luminance of the reference highlight image.

10. The catalog image generation method according to claim 6, wherein the at least one first intermediate lightness image is generated to have a mean luminance closer in value to the mean luminance of the reference shadow image than to the mean luminance of the desired lightness image.

11. The catalog image generation method according to claim 6, wherein the at least one second intermediate lightness image is generated to have a mean luminance closer in value to the mean luminance of the desired lightness image than to the mean luminance of the reference highlight image.

12. The non-transitory computer-readable recording medium storing the program according to claim 7, wherein the at least one first intermediate lightness image is generated to have a mean luminance closer in value to the mean luminance of the reference shadow image than to the mean luminance of the desired lightness image.

13. The non-transitory computer-readable recording medium storing the program according to claim 7, wherein the at least one second intermediate lightness image is generated to have a mean luminance closer in value to the mean luminance of the desired lightness image than to the mean luminance of the reference highlight image.

* * * * *